P. LAVELLE.
RESILIENT TIRE FOR VEHICLES.
APPLICATION FILED MAR. 22, 1913.
1,088,596.
Patented Feb. 24, 1914.
2 SHEETS—SHEET 2.
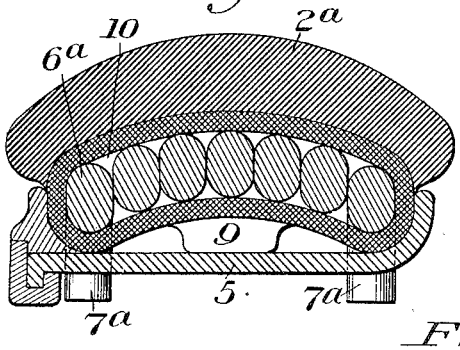
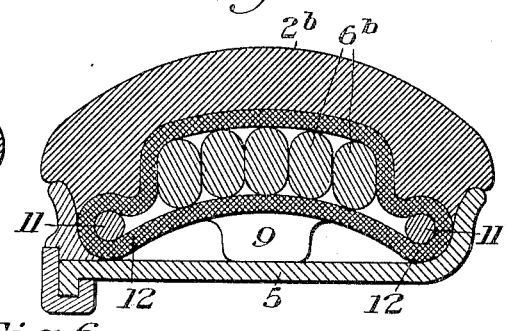
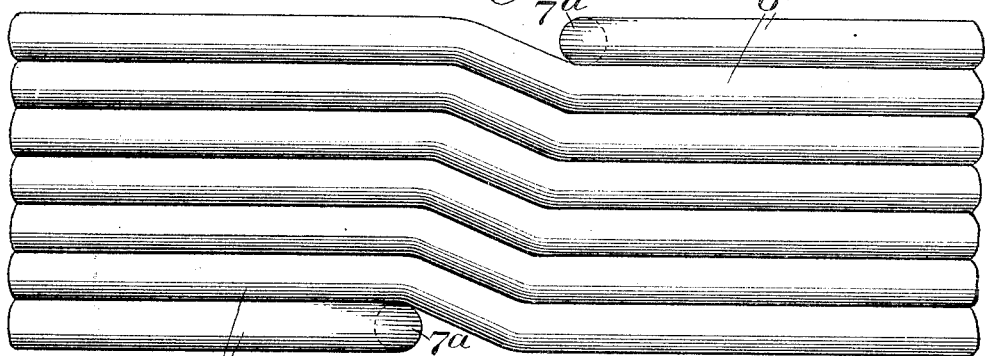
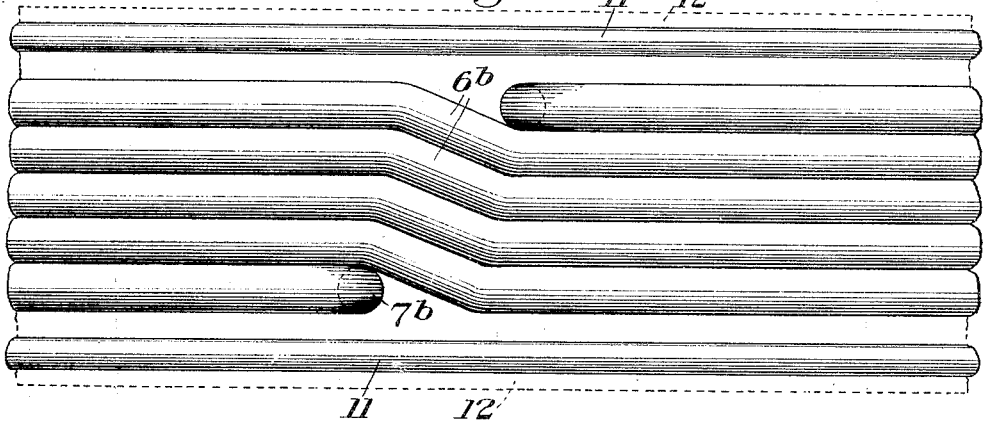
WITNESSES
INVENTOR

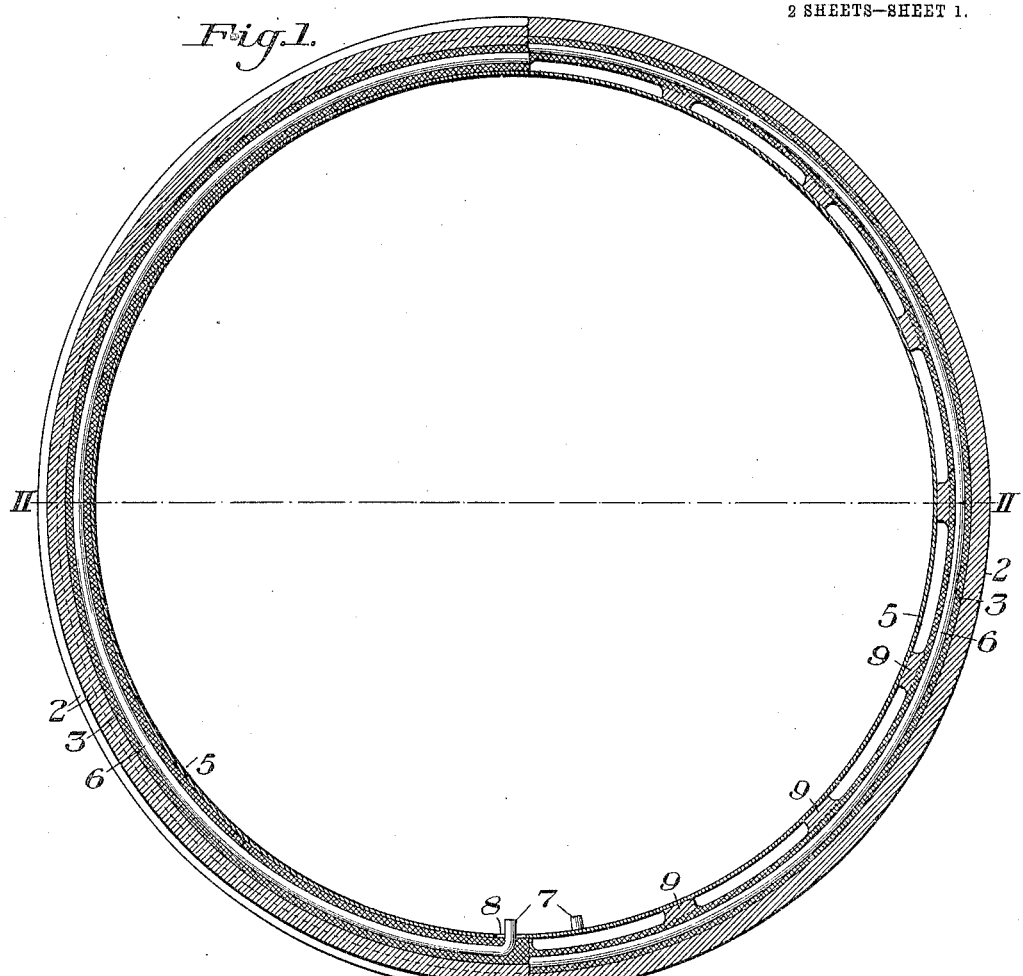
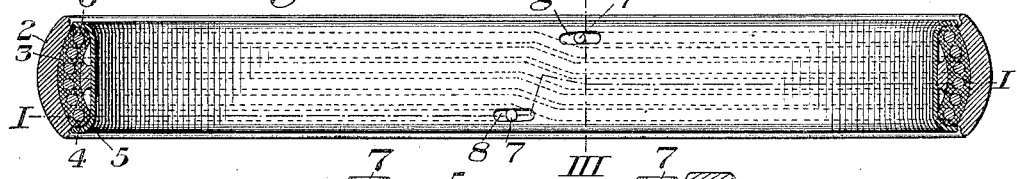
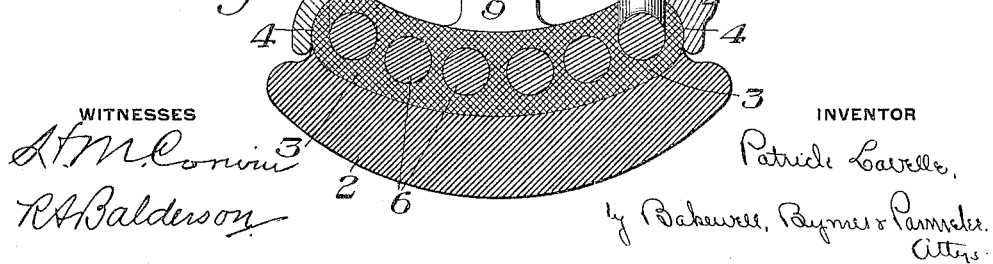

UNITED STATES PATENT OFFICE.

PATRICK LAVELLE, OF JOHNSTOWN, PENNSYLVANIA.

RESILIENT TIRE FOR VEHICLES.

1,088,596. Specification of Letters Patent. Patented Feb. 24, 1914.

Application filed March 22, 1913. Serial No. 756,132.

*To all whom it may concern:*

Be it known that I, PATRICK LAVELLE, a citizen of the United States, residing at Johnstown, in the county of Cambria and State of Pennsylvania, have invented a new and useful Improvement in Resilient Tires for Vehicles, of which the following is a full, clear, and exact description, reference being had to the accompanying drawings, forming part of this specification, in which—

Figure 1 is a vertical section of a resilient tire embodying my invention, one-half of the section being in one plane and the other half in a different parallel plane, as indicated by the line I—I in Fig. 2; Fig. 2 is a section on the line II—II of Fig. 1; Fig. 3 is a section on the line III—III of Fig. 2; Figs. 4 and 5 are views similar to Fig. 3, but showing two different modifications; and Figs. 6 and 7 are plan views showing the springs of Figs. 4 and 5, respectively.

My invention has relation to resilient tires for vehicles, and is designed to provide a tire of this class which can be readily constructed at a comparatively small cost, which will be durable in service and in which a high degree of elasticity may be obtained without the use of compressed air.

The nature of my invention will be best understood by reference to the accompanying drawings, in which I have illustrated the preferred embodiments thereof, and which will now be described, it being premised, however, that the invention is susceptible of various other embodiments and may be changed in various ways within the scope of the appended claim.

Referring first to that form of my invention shown in Figs. 1, 2 and 3, the numeral 2 designates the tread of the tire, which is preferably formed of rubber. Vulcanized to the inner concave surface of the tread 2 is a body 3 of suitable material, such as canvas or other fabric, preferably saturated with rubber or rubber solution, and which has its edge portion shaped as shown at 4, to fit the side flanges of any suitable sectional metallic rim 5. 6 is a spring which is formed by winding a stiff resilient wire or rod into a plurality of turns or convolutions and which is embedded within the body 3. The ends of the wire may be secured by bending them radially inward, as shown at 7, through slotted openings 8 in the metal rim 5. The inner concave face of the body 3 is shown as having a plurality of radial inward projections 9, spaced from each other around the circumference and adapted to bear against the outer surface of the rim 5. These projections are preferably of rubber vulcanized to the body 3, but may be of any suitable character. It will be noted that these projections 9 act as struts interposed between the spring and the rim member 5, and acting to limit the inward movements of the turns or convolutions of the spring. By reason of the limiting action of these strut projections, the movement of the spring under compression is more completely distributed throughout the circumference of the tire instead of being largely transmitted to the opposite side of the wheel, as would be the case in the absence of such projections.

The operation will be readily understood. The continuous spring 6 being interposed between the rubber tread and the rim 5 forms a resilient support for the tread. The different windings or convolutions of the spring can yield independently of each other to a very considerable extent, according as the tire meets with various obstructions in the road. The construction forms a resilient tire of very simple, durable and efficient character.

In the modification shown in Figs. 4 and 6, instead of supporting adjacent turns or convolutions of the spring $6^a$ and separately embedding the same in an elastic body, these turns or convolutions are placed side by side within a pocket 10 which may be formed of canvas or other suitable fabric vulcanized to the tread $2^a$. The end portions $7^a$ of the spring are secured in the rim member in the same manner as in the form first described.

In the modification shown in Figs. 5 and 7, the convolutions $6^b$ of the spring are also arranged side by side, but in this case, fewer convolutions are employed, so that instead of extending substantially the entire width of the tread $2^b$, they are at the central portion only thereof. In this form, I have also shown separate binding rings 11, seated in each side portion of the fabric pocket 12. The inner surface of the tread is recessed to receive the pocket 11 and the turns of the spring.

If desired, the shoe, together with the upper portion of covering for the spring may be omitted and the wheel run directly on the spring member. In this case, the turns or convolutions of the latter form the tread surface of the wheel.

It will be noted that in all the forms shown, the turns or convolutions of the spring form a flat arch. I preferably so arrange the spring that some portion of each turn or convolution of the spring will lie within the plane which is bounded by the circumferential edges of the side flanges of the rim. It will also be noted that the outer diameter of each of the intermediate loops is greater than the outer diameter of the outer loops, while the outer diameters of the outer loops are greater than the inner diameters of the intermediate loops. By this arrangement, I provide a construction in which side thrusts are directly transmitted to the flanges of the rim member and thus largely reduce the shearing tendency of the tire under such thrusts. It will also be noted that the sum of the cross sectional diameters of the several portions of the spring is less than the distance between the flanges 4 of the rim, thus greatly lessening the tendency of the different portions to spread apart under pressure.

My invention is susceptible of various other modifications in the details of arrangement of the spring, in the number of turns or convolutions employed, in the form of the tread, and in the form of the pocket or body in which the spring is secured. The tire can be shaped to fit any usual or suitable form of metal rim.

I claim:

The combination with a flanged rim member, of a spring seated between the flanges of the rim member comprising a member wound circumferentially of the rim member into a plurality of adjacent convolutions lying side by side in transversely arched arrangement, the ends of said continuous member being secured to the rim member, and resilient supporting means interposed between the said spring and the rim member, said supporting means resting directly on the rim member underneath some of the convolutions and permitting yielding movement of the individual convolutions under compression, while also acting to transmit a portion of such compression directly to the rim member adjacent to the point at which the compression occurs; substantially as described.

In testimony whereof, I have hereunto set my hand.

PATRICK LAVELLE.

Witnesses:
C. J. BRANDLER,
THOS. L. O'CONNELL.

---

Copies of this patent may be obtained for five cents each, by addressing the "Commissioner of Patents, Washington, D. C."